United States Patent [19]

Nurmi et al.

[11] Patent Number: 5,515,817
[45] Date of Patent: May 14, 1996

[54] CONNECTION ARRANGEMENT FOR PRESSURE MEDIUM CHANNELS IN A DIESEL ENGINE

[75] Inventors: Hannu Nurmi; Sven Jansson, both of Vaasa, Finland

[73] Assignee: Wartsila Diesel International Ltd Oy, Helsinki, Finland

[21] Appl. No.: 388,212

[22] Filed: Feb. 13, 1995

[30] Foreign Application Priority Data

Mar. 25, 1994 [FI] Finland ............................. 941450

[51] Int. Cl.$^6$ .................................................... F01P 3/00
[52] U.S. Cl. ........................ 123/41.29; 123/41.33; 123/196 AB
[58] Field of Search ..................... 123/41.01, 41.29, 123/41.31, 41.33, 195 R, 196 AB

[56] References Cited

FOREIGN PATENT DOCUMENTS

| | | | |
|---|---|---|---|
| 0034996 | 2/1981 | European Pat. Off. . | |
| 908144 | 4/1946 | France . | |
| 307178 | 11/1917 | Germany | 123/41.29 |
| 317904 | 11/1917 | Germany | 123/41.29 |
| 3203964 | 2/1982 | Germany . | |
| 580619 | 9/1946 | United Kingdom . | |
| 702074 | 1/1954 | United Kingdom . | |
| 1213529 | 11/1970 | United Kingdom . | |

*Primary Examiner*—Noah P. Kamen
*Attorney, Agent, or Firm*—Smith-Hill and Bedell

[57] ABSTRACT

Connection arrangement for pressure medium ducts in a diesel engine for connecting at least two ducts (2,3), included in the same pressure medium system, located parallel in the longitudinal direction of an engine block (1) and being in successive order in the flow direction of the pressure medium circulation of the system, either together or separately with one or more devices or units, for instance with coolers (8,9), located on the side of the ducts and included in the pressure medium system in question so that a desired direction of flow is accomplished and that said connection prevents the pressure medium flow of the inlet side and of the outlet side of the device from being mixed with each other. The arrangement includes a set of different, preferably cylindrical, hollow duct assemblies (4) to be installed in a connection chamber made in the engine block at a desired location. The connection chamber connects the ducts with each other (2,3) and includes a connection aperture (5) on the side of the ducts for connection thereof to said device or unit (8,9). The duct assemblies (4) include two or more flow guidance apertures (4a,4b) being located so as to accomplish different flow alternatives. The connection chamber is then provided with one or more sealing surfaces (5a,6a,7,7') arranged to cooperate with the duct assembly (4) selected in each case so that the duct assembly (4) is sealed according to need to the connection aperture (5), to the wall between the ducts and/or to the upper and/or lower walls of at least one of the ducts.

20 Claims, 3 Drawing Sheets

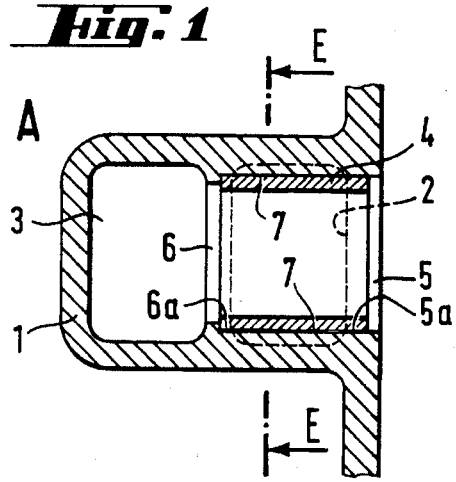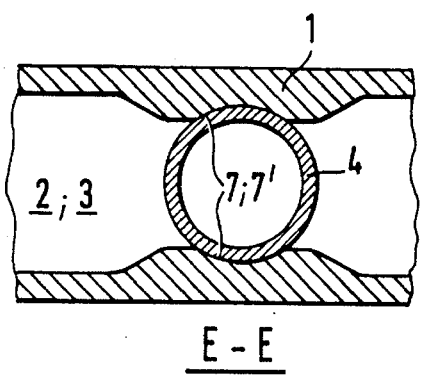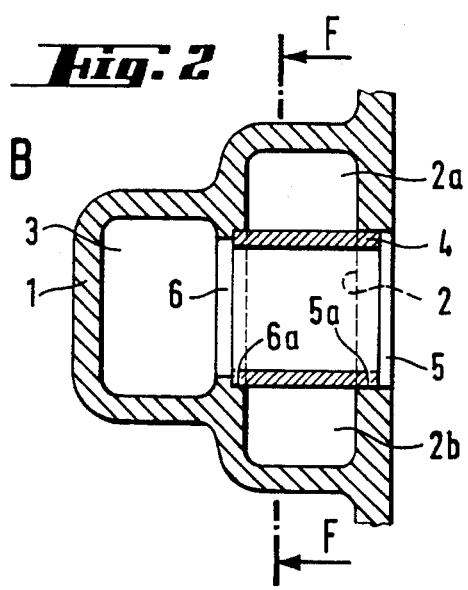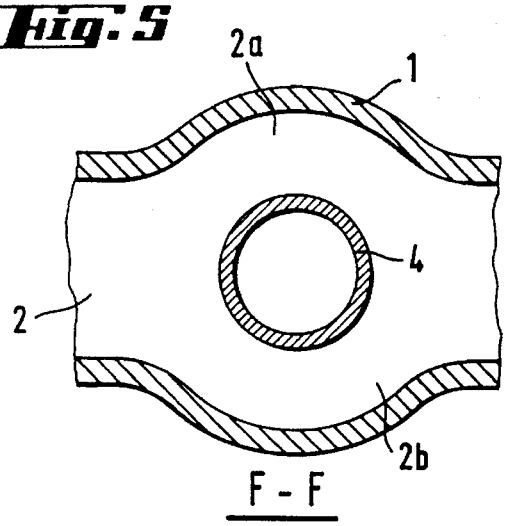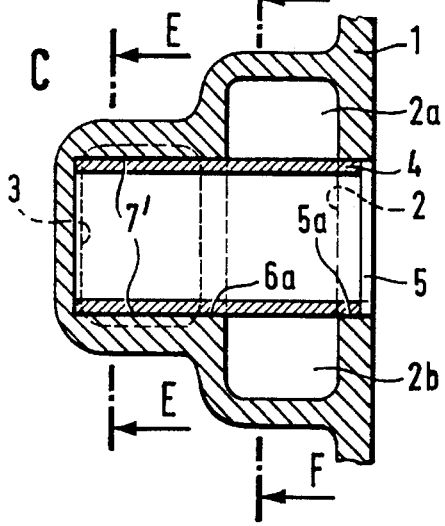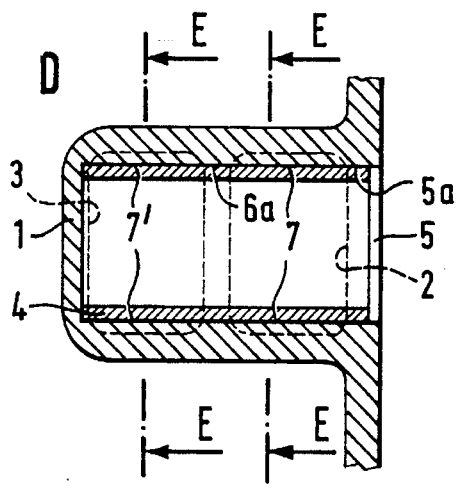

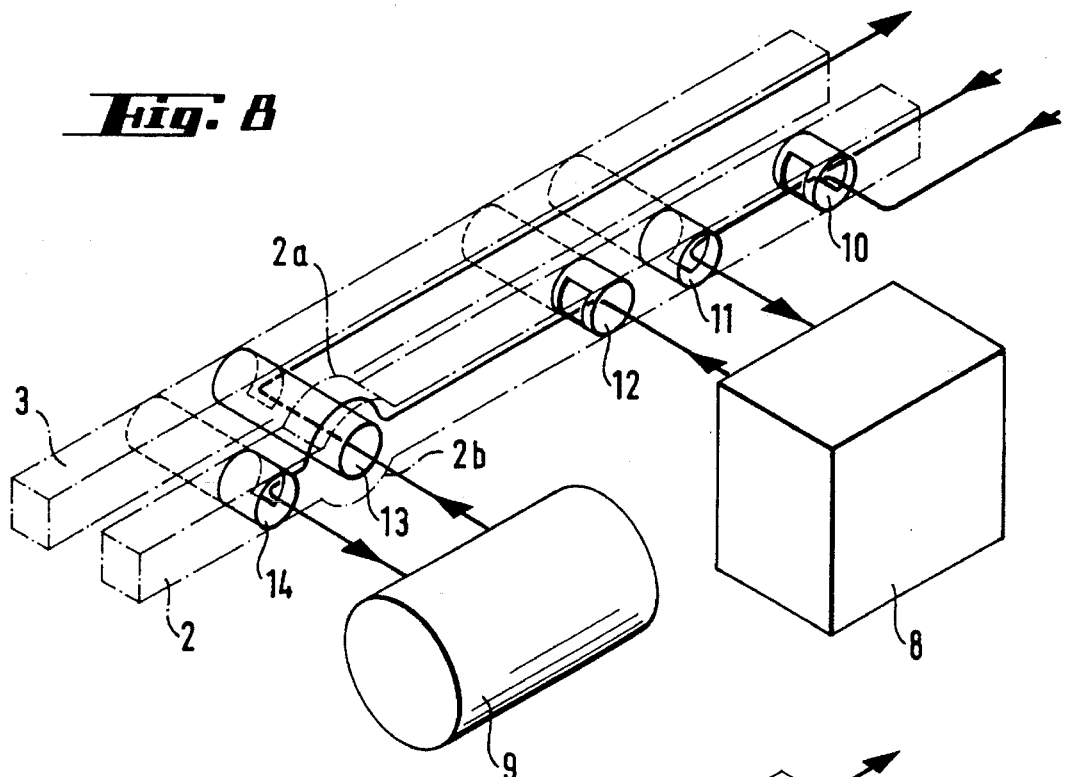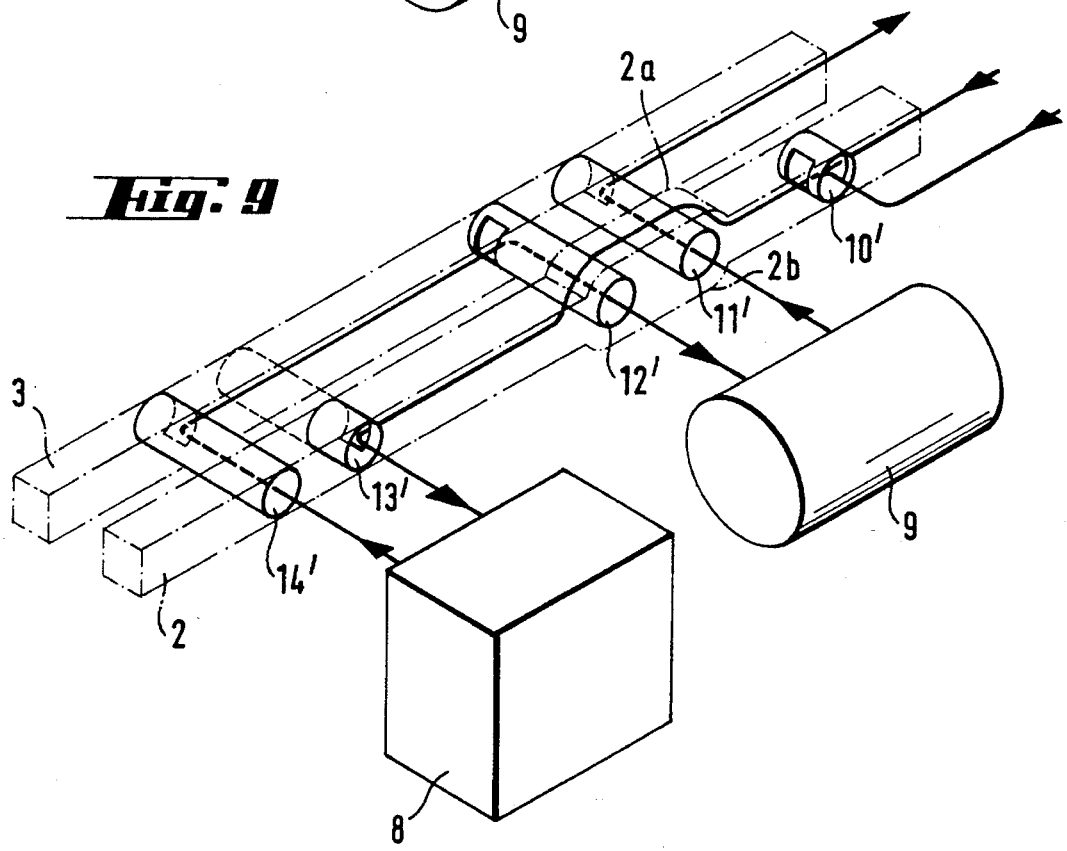

CONNECTION ARRANGEMENT FOR PRESSURE MEDIUM CHANNELS IN A DIESEL ENGINE

BACKGROUND OF THE INVENTION

The invention relates to a connection arrangement for pressure medium ducts in a diesel engine, especially in a large diesel engine. In this specification, the term "large diesel engine" means a diesel engine for use, for example, as a main or auxiliary engine in a ship or in a power plant for production of heat and/or electricity.

In a large turbocharged diesel engine, it is necessary to cool both the charge air and the cooling oil. Normally the cooling water in both the inlet and outlet side is connected to the coolers for the charge air and cooling oil by means of separate pipes, which is a complicated and expensive solution. An alternative solution is to provide ducts for leading cooling water inside the engine block, which is advantageously accomplished when the engine block is cast. From the viewpoint of space requirements the ducts are in this case advantageously arranged side by side in the engine block. A problem is then how to conduct cooling water from the parallel ducts into the coolers located outside the engine block so that the cooling water on the inlet side is not mixed with the cooling water on the outlet side.

In practice the cooling water is first circulated through the charge air cooler and only than through the oil cooler. However, the order of the coolers in the longitudinal direction of the engine may vary, which poses additional problems with the circulation of the cooling water.

SUMMARY OF THE INVENTION

An aim of the invention is to provide a connection arrangement for pressure medium ducts located parallel to one another in the engine block and by means of which the problems discussed above can be eliminated. In addition the arrangement should be advantageous with respect to manufacturing cost and provide versatile alternatives for guiding flow for implementing different connection requirements for pressure medium flows.

The arrangement according to the invention includes a set of different, preferably cylindrical, hollow duct assemblies to be installed in a connection chamber that is made in the engine block at a desired location and connects the ducts with each other and includes a connection aperture on the side of the ducts for connection to a cooler. The duct assemblies each include two or more flow guidance apertures, which are located so as to accomplish different flow alternatives. in addition the connection chamber is provided with one or more sealing surfaces arranged to cooperate with the selected duct assembly so that the duct assembly is sealed according to need to the connection aperture, to the wall between the ducts and/or to the upper and/or lower walls of at least one of the ducts. In this way the desired flow alternatives can be implemented by forming the connection chamber to comprise certain sealing surfaces and by selecting a duct assembly that includes flow guidance apertures as required by the pressure medium flows.

The arrangement advantageously includes a duct assembly that is sealed to the connection aperture and to the wall between the ducts so that it connects only the rearmost duct to the connection aperture leading out. If then it is not desirable that the flow in the foremost duct is blocked, the connection chamber can be formed so that it allows through-flow in the foremost duct past the connection aperture and the duct assembly installed in the connection chamber.

The arrangement can further include a duct assembly that is sealed to the connection aperture and to the wall between the ducts and is provided with flow guidance apertures so that it connects only the foremost duct to the connection aperture leading out to the cooler.

In one embodiment the connection chamber is provided with sealing surfaces arranged in the connection aperture and in the wall between the ducts and with sealing surfaces arranged at the position of at least one duct preventing, together with the duct assembly, flow in the duct past the duct assembly, whereby the duct assembly correspondingly is provided with at least one flow guidance aperture located at the mantle surface thereof at the position of the duct for leading the flow out from the duct, for instance for connecting the duct to the connection aperture leading out or for leading the flow from one duct to another.

Said sealing surfaces can be arranged at the position of both the ducts, whereby by providing the duct assembly with two flow guidance apertures, one at the position of either of the ducts, the flow can be led from one duct to the other. At the same time the connection between both the ducts and the connection aperture can be blocked. In this manner the flow can be led to the other side of the ducts, for instance to be led further into a device or part of the engine, or the direction of the flow can be changed.

BRIEF DESCRIPTION OF THE DRAWINGS

The invention will now be further described, by way of example, with reference to the accompanying drawings, in which FIGS. 1–4 show different connection chamber solutions for tube assemblies included in the connection arrangement for pressure medium ducts according to the invention, located in an engine block and seen as a transversal cross-section with regard to the ducts, FIGS. 5 and 6 show cross-sections taken on the lines E—E and F—F of FIGS. 1–4, FIGS. 7a–7g show different tube assemblies to be applied for different flow alternatives, FIG. 8 shows in principle how to apply the arrangement according to the invention in a big diesel engine for the case in which parallel ducts in the engine block are included in a cooling medium circuit, to which are connected in successive order first a charge air cooler for a turbocharger and then an oil cooler, and FIG. 9 shows a modification of the case in FIG. 8, in which the mutual location of the coolers in the engine is reversed.

DETAILED DESCRIPTION

Figure 7A:
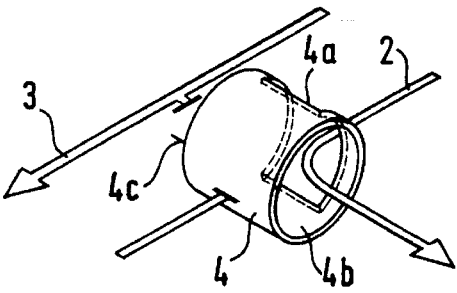

In the drawings 1 indicates an engine block of a big diesel engine including pressure medium ducts 2 and 3, disposed parallel to the longitudinal direction of the engine block. The ducts are formed in the casting phase of the engine block and at the same time the ducts are provided with connecting chambers at locations planned in advance and for a selected purpose for leading pressure medium flows by means of connecting tubes through desired devices, for example coolers connected to the engine, as is schematically shown in FIGS. 8 and 9.

A connecting chamber includes a connection aperture 5, in which a tube assembly 4 selected for the purpose in each case is installed to guide pressure medium flows in the ducts 2 and 3 in a desired way. The connection chamber also has an aperture 6 located in the separating wall of the ducts 2 and 3 and connecting the ducts with each other. The apertures 5 and 6 are provided correspondingly with sealing surfaces 5a and 6a for sealing the tube assembly 4 located in the connection aperture. Additionally, the connecting chamber may be equipped at the position of either one or both of the ducts with sealing surfaces 7 and 7' arranged at the upper and/or lower wall and which together with the tube assembly 4 prevent the flow in the duct past the tube assembly, whereby the flow may be guided in a desired manner by means of flow guidance apertures, located at different places in the tube assembly. If necessary, the outermost duct 2 of the engine block may, however, be designed to comprise an enlargement portion 2a and/or 2b for guiding the flow in the duct 2 past the tube assembly as appears from FIGS. 2, 3 and 5.

Figure 7B:
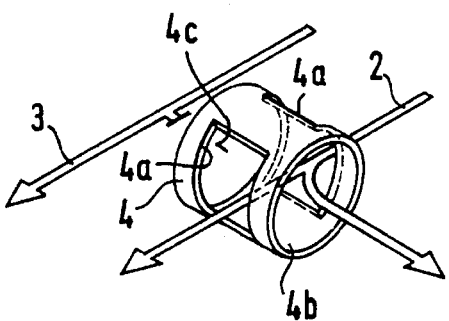
Figure 7C:
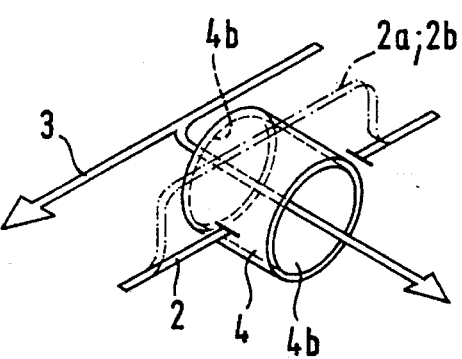
Figure 7D:
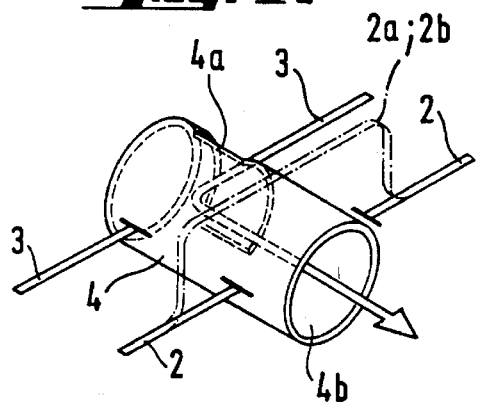
Figure 7E:
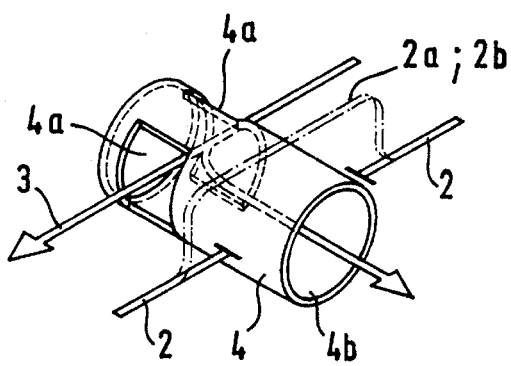

FIGS. 7a–7g show different tube assemblies 4, which can be sealed to the sealing surfaces 5a and 6a of the connection chamber and additionally, if necessary, to the sealing surfaces 7 and/or 7' and which are equipped with flow guidance apertures at different locations for achieving the desired flow alternatives. The path in each case is shown by arrows. The reference numeral 4a indicates a flow guidance aperture, made in the mantle surface of the tube assembly and 4b correspondingly a flow guidance aperture made in the end surface of the tube assembly. The reference numeral 4c indicates a blocking wall arranged at the gable part of the tube assembly for preventing the flow. FIGS. 7c, 7d, and 7e show also schematically the effect of a possible enlargement portion 2a and/or 2b of the connection chamber with the tube assembly in question.

Figure 7F:
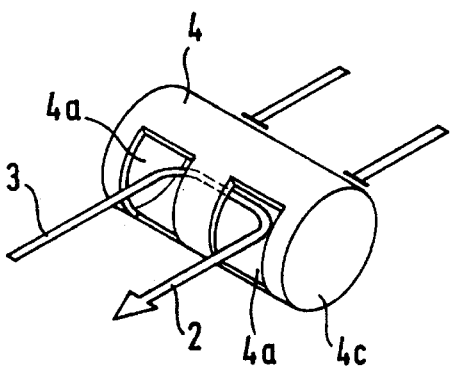
Figure 7G:
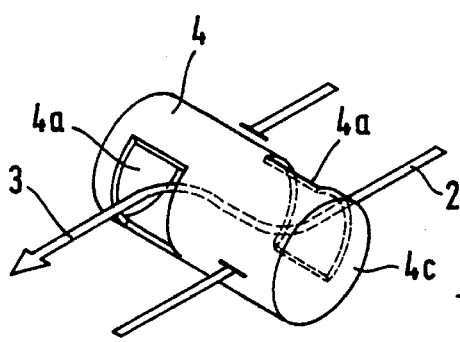

FIGS. 7f and 7g show tube assemblies which are used for guiding the flow from one duct to another, whereby the pressure medium flow can be guided to devices located at either side of the flow ducts 2 and 3 in a desired order.

FIG. 8 shows schematically a case in which the parallel ducts 2 and 3 in the engine block are included in a cooling medium circuit, to which are connected one after another first a charge air cooler 8 of a turbocharger and then an oil cooler 9. In this case a turbocharger (not shown) is located at the so-called free end of the engine. Correspondingly FIG. 9 illustrates an alternative arrangement located at the flywheel end of the engine. Then the order of the coolers 8 and 9 is reversed relative to the feeding direction of the pressure medium flow, which is accomplished by using suitable connection chamber and tube assembly arrangements so that the flow is first led through the charge air cooler and only thereafter through the oil cooler. The flow is led into the duct 2 from the pressure side of a circulation pump (not shown) and possibly from a flow branch from a reserve pump and the duct 3 is connected to the suction side of the pump.

With reference to the embodiment of FIG. 8, the tube assembly 10 may be in accordance with FIG. 7b and the connection chamber of type A, as shown in FIG. 1. Correspondingly the tube assemblies 11 and 12 may be in accordance with FIG. 7a and the respective connection chambers of type A. The tube assembly 13 may be in accordance with FIG. 7c and the connection chamber of type B (FIG. 2) or alternatively in accordance with FIG. 7d and the connection chamber of type C (FIG. 3). The tube assembly 14 may be in accordance with FIG. 7a and the connection chamber of type A (FIG. 1).

Correspondingly in the embodiment of FIG. 9, the tube assembly 10' may be in accordance with FIG. 7b and the connection chamber of type A (FIG. 1). The tube assembly 11' may be in accordance with FIG. 7d and the connection chamber of type C (FIG. 3). The tube assembly 12' may be in accordance with FIG. 7c or alternatively in accordance with FIG. 7d and the connection chamber of type C (FIG. 3). The tube assembly 13' may be in accordance with FIG. 7a and the connection chamber of type A (FIG. 1). The tube assembly 14' may be in accordance with FIG. 7d and the connection chamber of type D (FIG. 4) or alternatively in accordance with FIG. 7c and the connection chamber of type A (FIG. 1).

It is clear that the arrangements according to the invention are not dependent on the pressure medium used in each case but are applicable equally well for water and for oil, for example. The tube assemblies are preferably cylindrical, because it is advantageous from the viewpoint of both manufacturing technique and connecting of the connection tubes.

The invention is, thus, not limited to the embodiments shown, but several modifications thereof are feasible within the scope of the attached claims.

We claim:

1. A diesel engine comprising:

an elongate engine block formed with first and second ducts, one of said first and second ducts being a flow duct for receiving pressure medium from a source of pressure medium and the other of said ducts being a return duct for returning pressure medium from the flow duct to the source for recirculation, the first and second ducts extending longitudinally of the engine block and having a separating wall therebetween, and there being an outer wall between the ducts and an exterior surface of the engine block, and the block being formed with at least first and second bores in the separating wall and at least first and second bores in the outer wall, the first bore in the outer wall being substantially aligned with the first bore in the separating wall and the second bore in the outer wall being substantially aligned with the second bore in the separating wall, at least one heat exchange device located laterally of the first and second ducts and formed with a conduit for receiving pressure medium, and a first hollow duct assembly installed in at least the first bore in the outer wall and a second hollow duct assembly installed in at least the second bore in the outer wall, the first and second hollow duct assemblies being connected to the conduit in the heat exchange device and each duct assembly being formed with at least two flow guidance apertures and having a surface that is in sealing relationship with at least one surface of the engine block.

2. A diesel engine according to claim 1, wherein the first and second ducts have proximal ends nearer the source of pressure medium and distal ends farther from the source of pressure medium, the first hollow duct assembly connects the first duct to the conduit in the heat exchange device, and the second hollow duct assembly connects the conduit to the first duct in the engine block, whereby pressure medium flowing in the first duct is diverted through the conduit, and the engine further comprises an interconnecting means connecting the first and second ducts at a location that is between, on one hand, the first duct assembly and the second duct assembly and, on other hand, the distal ends of the first and second ducts.

3. A diesel engine according to claim 2, wherein the first duct is the flow duct.

4. A diesel engine according to claim 2, wherein the first duct is the return duct.

5. A diesel engine according to claim 2, wherein the engine block is formed with at least a third bore in the outer wall and at least a third bore in the separating wall, the third bore in the outer wall being, on one hand, between the first and second bores and, on other hand, the distal ends of the ducts and being substantially aligned with the third bore in the separating wall, and the interconnecting means includes a third hollow duct assembly installed in the third bores, the third hollow duct assembly being formed with at least two flow guiding apertures and having a surface that is in sealing relationship with at least one surface of the engine block.

6. A diesel engine according to claim 1, wherein the first hollow duct assembly connects the flow duct to the conduit in the heat exchange device, and the second hollow duct assembly connects the conduit to the return duct in the engine block, whereby pressure medium flowing in the flow duct is led through the conduit to the return duct.

7. A diesel engine according to claim 1, wherein the engine block is formed with at least third and fourth bores in the separating wall and at least third and fourth bores in the outer wall, the third bore in the outer wall being substantially aligned with the third bore in the separating wall and the fourth bore in the outer wall being substantially aligned with the fourth bore in the separating wall, said heat exchange device is a first heat exchange device and the engine further comprises a second heat exchange device located laterally of the first and second ducts and formed with a conduit for receiving pressure medium, a third hollow duct assembly installed in at least the third bore in the outer wall, and a fourth hollow duct assembly installed in at least the fourth bore in the outer wall, the third and fourth hollow duct assemblies being connected to the conduit in the second heat exchange device and each of the third and fourth duct assemblies being formed with at least two flow guidance apertures and having a surface that is in sealing relationship with at least one surface of the engine block.

8. A diesel engine according to claim 7, wherein the first and second ducts have proximal ends nearer the source of pressure medium and distal ends farther from the source of pressure medium, the third bores and the fourth bores are between, on one hand, the first and second duct assemblies and, on other hand, the distal ends of the first and second ducts, and the third and fourth hollow duct assemblies and the conduit in the second heat exchange device interconnect the first and second ducts.

9. A diesel engine according to claim 8, wherein the first duct is between the outer wall and the separating wall, the first hollow duct assembly connects the first duct to the conduit in the first heat exchange device, and the second hollow duct assembly connects the conduit in the first heat exchange device to the first duct in the engine block, whereby pressure medium flowing in the first duct is diverted through the conduit in the first heat exchange device.

10. A diesel engine according to claim 9, wherein the third bores are between, on one hand, the fourth duct assembly and, on other hand, the distal ends of the first and second ducts, and the first duct defines a bypass around the fourth hollow duct assembly.

11. A diesel engine according to claim 8, wherein the first duct is between the outer wall and the separating wall, the first hollow duct assembly connects the second duct to the conduit in the first heat exchange device, and the second hollow duct assembly connects the conduit in the first heat exchange device to the second duct in the engine block, whereby pressure medium flowing in the second duct is diverted through the conduit in the first heat exchange device.

12. A diesel engine according to claim 11, wherein the first duct defines a bypass around the first and second hollow duct assemblies.

13. A diesel engine according to claim 1, wherein the first duct is between the outer wall and the separating wall and the first duct assembly defines a flow guidance aperture in a mantle surface thereof and a second flow guidance aperture at an end of the first duct assembly, and wherein the first hollow duct assembly is installed in the first bores so that it provides communication between the second duct and the conduit in the heat exchange device, and the first hollow duct assembly is sealed to the separating wall and to the outer wall.

14. A diesel engine according to claim 13, wherein the first duct defines a bypass around the first hollow duct assembly.

15. A diesel engine according to claim 1, wherein the first duct is between the outer wall and the separating wall and the first hollow duct assembly defines a first flow guidance aperture in a mantle surface thereof and a second flow guidance aperture at an end thereof and the first hollow duct assembly is installed in the first bore of the outer wall so that it connects only the first duct to the conduit in the heat exchange device.

16. A diesel engine according to claim 15, wherein the first hollow duct assembly is blocked at its end opposite said second flow guidance aperture and is sealed to the separating wall and the outer wall.

17. A diesel engine according to claim 1, wherein the first and second ducts have proximal ends nearer the source of pressure medium and distal ends farther from the source of pressure medium, the engine block is formed with at least a third bore in the separating wall and at least a third bore in the outer wall, the third bore in the outer wall being substantially aligned with the third bore in the separating wall, and the third bores bores are between, on one hand, the first and second duct assemblies and, on other hand, the distal ends of the first and second ducts, and the engine further comprises a third hollow duct assembly installed in the third bores, the third duct assembly having a surface that is in sealing relationship with the first duct, whereby flow of pressure medium in the first duct past the third duct assembly is prevented, and wherein the third duct assembly is formed with at least one flow guidance aperture in a mantle surface thereof for receiving flow of pressure medium from the first duct.

18. A diesel engine according to claim 17, wherein the third duct assembly has a surface that is in sealing relationship with a surface of the second duct and the third duct assembly is formed with a second flow guidance aperture in its mantle surface, whereby flow of pressure medium is guided from the flow duct to the return duct.

19. A method of assembling a diesel engine that comprises an elongate engine block formed with first and second ducts, one of said first and second ducts being a flow duct for receiving pressure medium from a source of pressure medium and the other of said ducts being a return duct for returning pressure medium from the flow duct to the source for recirculation, the first and second ducts extending longitudinally of the engine block and having a separating wall therebetween, and there being an outer wall between the ducts and an exterior surface of the engine block, the method comprising:

forming at least first and second bores in the separating wall and at least first and second bores in the outer wall, the first bore in the outer wall being substantially aligned with the first bore in the separating wall and the second bore in the outer wall being substantially aligned with the second bore in the separating wall, mounting at least one heat exchange device laterally of the first and second ducts, the heat exchange device being formed with a conduit for receiving pressure medium, and installing a first hollow duct assembly in at least the first bore in the outer wall and a second hollow duct assembly in at least the second bore in the outer wall, the first and second hollow duct assemblies being connected to the conduit in the heat exchange device and each duct assembly being formed with at least two flow guidance apertures and having a surface that is in sealing relationship with at least one surface of the engine block.

20. A method of providing circulation of pressure medium between a diesel engine that comprises an elongate engine block formed with first and second ducts, one of said first and second ducts being a flow duct for receiving pressure medium from a source of pressure medium and the other of said ducts being a return duct for returning pressure medium from the flow duct to the source for recirculation, and at least one heat exchange device mounted laterally of the first and second ducts and formed with a conduit for receiving pressure medium, the first and second ducts extending longitudinally of the engine block and having a separating wall therebetween, and there being an outer wall between the ducts and an exterior surface of the engine block, the method comprising:

forming at least first and second bores in the separating wall and at least first and second bores in the outer wall, the first bore in the outer wall being substantially aligned with the first bore in the separating wall and the second bore in the outer wall being substantially aligned with the second bore in the separating wall, providing a plurality of hollow duct assemblies each formed with at least two guidance apertures and having a surface that can be arranged in sealing relationship with at least one surface of the engine block, selecting at least first and second hollow duct assemblies from said plurality of hollow duct assemblies, installing the first hollow duct assembly in at least the first bore in the outer wall and the second hollow duct assembly in at least the second bore in the outer wall, and connecting the conduit in the heat exchange device to the first and second hollow duct assemblies, whereby the conduit is connected to at least one of the ducts in the engine block.

\* \* \* \* \*